July 9, 1968  C. J. LAMBERTON  3,392,326
COIL WINDING BUFFER CONDUCTORS HAVING IMPEDANCE MEANS
Filed Sept. 28, 1966  3 Sheets-Sheet 1

INVENTOR:
CLIFFORD J. LAMBERTON,
BY J. Wesley Haubner
ATTORNEY

July 9, 1968  C. J. LAMBERTON  3,392,326
COIL WINDING BUFFER CONDUCTORS HAVING IMPEDANCE MEANS
Filed Sept. 28, 1966  3 Sheets-Sheet 2
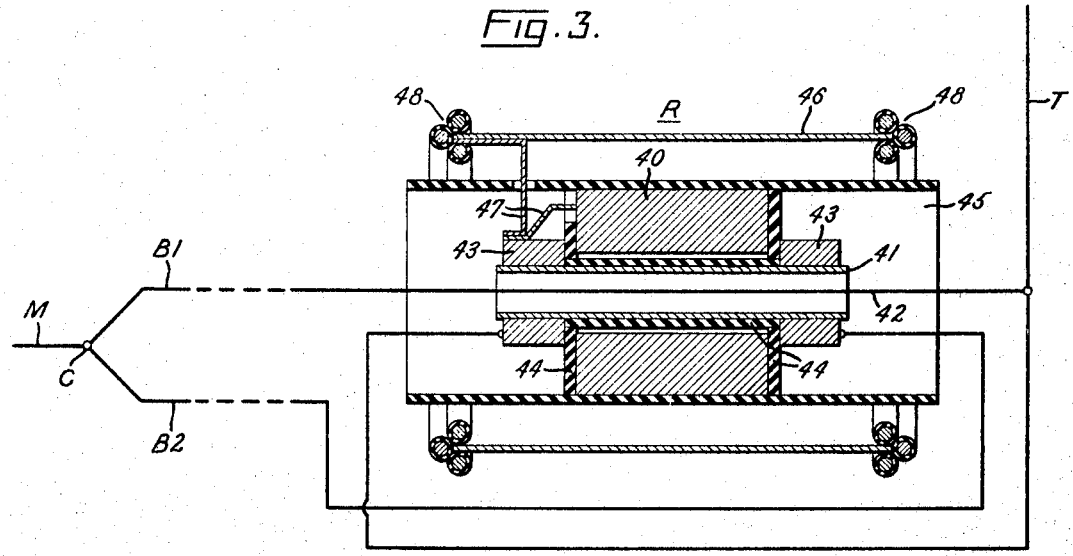
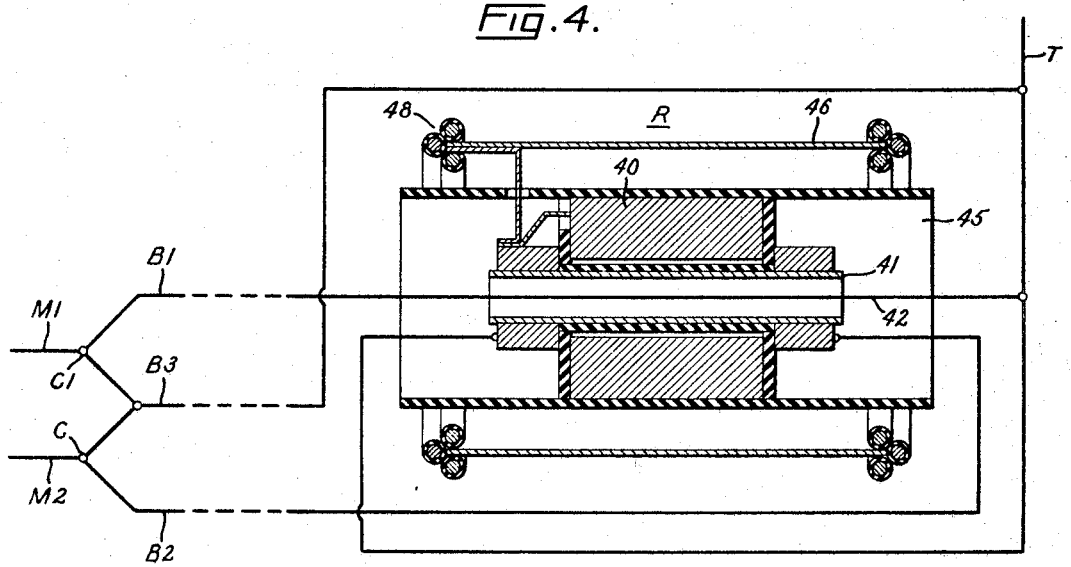
INVENTOR:
CLIFFORD J. LAMBERTON,
BY *J Wesley Haubner*
ATTORNEY July 9, 1968  C. J. LAMBERTON  3,392,326
COIL WINDING BUFFER CONDUCTORS HAVING IMPEDANCE MEANS
Filed Sept. 28, 1966  3 Sheets-Sheet 3
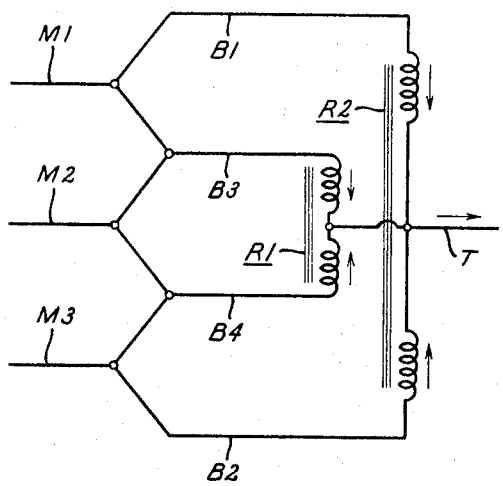
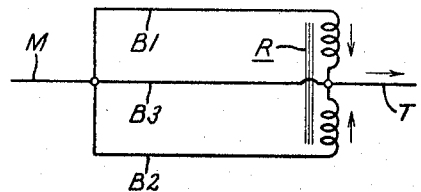
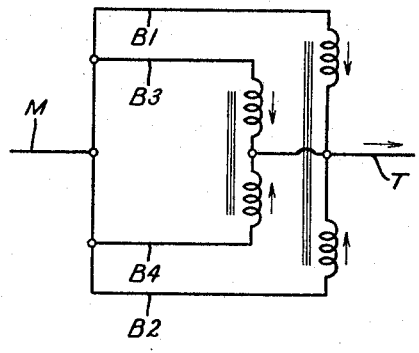
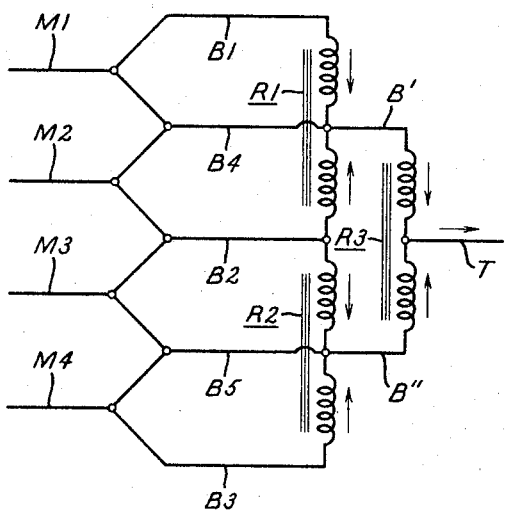
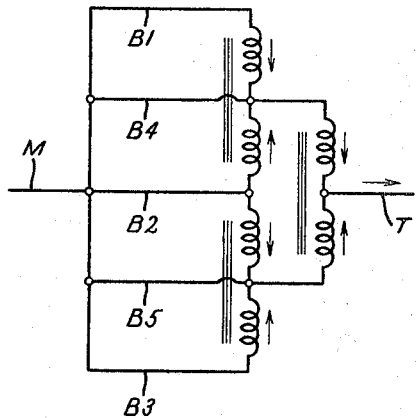
INVENTOR:
CLIFFORD J. LAMBERTON,
BY
ATTORNEY

United States Patent Office 3,392,326
Patented July 9, 1968

3,392,326
COIL WINDING BUFFER CONDUCTORS
HAVING IMPEDANCE MEANS
Clifford J. Lamberton, Pittsfield, Mass., assignor to General Electric Company, a corporation of New York
Filed Sept. 28, 1966, Ser. No. 582,673
10 Claims. (Cl. 323—83)

My invention relates to stationary electric induction apparatus such as transformers, reactors and the like, and particularly to high voltage windings for such apparatus having end turns insulated more heavily than the remainder of the winding.

Inductive windings designed for high voltage, as the high voltage windings of large electric power transformers, are frequently more heavily insulated at the high voltage end than throughout the remainder of the winding. The several turns at the high voltage end of such a winding are subjected to higher electrostatic stress in steady state operation than is the remainder of the winding. Moreover, when high transient voltage impulses are applied to a winding, unequal transient distribution of voltage subjects the high voltage end of the winding to disproportionately high electric stress.

The additional insulation thus required on the end turns of a high voltage winding impairs the conduction of heat from these turns, so that it is desirable to provide in the end turns a greater cross section of current-carrying conductor than in the main body of the winding. To provide such additional cross section of conductor, it has been the practice, as required, to wind the heavily insulated end turns of two or more conductors positioned and connected physically and electrically in parallel. Such multiple, heavily insulated end turns are referred to as buffer conductors. Being connected as they are in parallel circuit relation with each other, each pair of buffer conductors constitutes a local loop circuit. If parallel buffer conductors of such a loop circuit are so wound that they are exposed to slightly unequal flux linkages, undesired circulating currents will be established. Such circulating current causes unnecessary and undesirable heating and energy loss.

It is therefore a general object of my invention to provide means for substantially eliminating circulating electric currents in parallel-connected buffer turns of an inductive electric winding.

It is a more particular object of the invention to provide means for limiting such circulating currents to an acceptable low value without appreciably impeding the flow of load current in the parallel-connected buffer conductors.

It is still another object of my invention to provide impedance means especially designed and adapted to limit circulating current in parallel-connected multiple buffer conductors at the end turns of an inductive winding without undesirably impeding the flow of load current through said conductors.

A further object of my invention is to provide current limiting impedance means of such character in conjunction with any number of parallel-connected multiple buffer conductors at the end turns of an inductive winding.

In carrying out my invention in one preferred embodiment, I connect one or more main winding conductors directly to a plurality of end turn buffer conductors greater in number than the number of main conductors. The outer or terminal ends of one or more pairs of the buffer conductors are connected together through one or more current limiting inductors each of which has its midpoint connected, directly or through additional inductance, to a single external winding terminal. In a preferred form each current limiting inductor comprises a magnetizable core having wound thereon in magnetically opposing, or bucking, relation to a pair of series connected coils. The coils have their common terminal, or midpoint, connected to the external winding terminal and their opposite ends connected to two separate buffer conductors. The oppositely wound inductor coils may, if desired, each be formed of a single turn or less, as for example axial conductors traversing a ring-type magnetic core.

My invention will be more fully understood and its various objects and advantages further appreciated by referring now to the following detailed specification taken in conjunction with the accompanying drawing in which:

FIGS. 3 and 4 are cross-sectional views of a current limiting inductor, and illustrating schematically its connection to several buffer conductor combinations in accordance with my invention; and FIG. 5 to 9 are schematic circuit diagrams illustrating my invention in conjunction with a variety of buffer conductor combinations.

Figure 1:
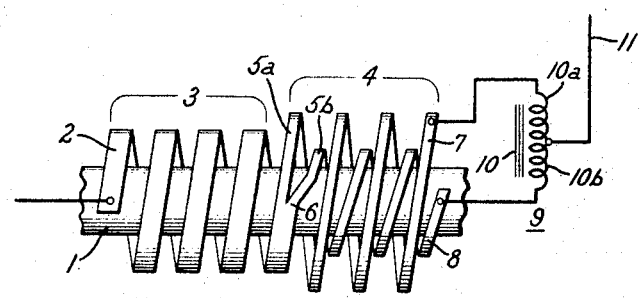
FIG. 1 is a simplified side elevational view of a helical or layer-type inductive winding illustrating my invention schematically.

Referring now to the drawing, I have shown at FIG. 1 an inductive winding of the helical or layer type encircling a magnetizable core 1. The winding comprises a plurality of turns of a single conductor 2 forming a main winding section 3 and terminates in an end portion 4 composed of several turns of two parallel buffer conductors 5a and 5b. The buffer conductors are wound together in parallel physical relation and have a common internal juncture with one end of the main conductor 2 at a point 6. Terminal ends 7 and 8 of the buffer conductors 5a and 5b, respectively, are connected together through an inductive reactor 9 which comprises a pair of coils 10a, 10b wound upon a common core 10. The reactor coils 10a, 10b are connected in series between the conductor ends 7, 8 and the common terminal, or midpoint of the coils is connected to a single external terminal lead 11.

It will be understood by those skilled in the art that in the interest of clarity of illustration the several turns of the main and end sections of the winding at FIG. 1 have been shown exploded or expanded and that only a single layer of the helical winding has been shown. If, desired of course, the main winding section 3 may be laid up in a plurality of helical layers, but the buffer conductors 5a and 5b will ordinarily comprise a relatively small number of turns at the high voltage end of the winding.

In the inductive reactor 9 connected between the terminal ends 7 and 8 of the buffer conductors the coils 10a, 10b are so wound, or disposed, upon the core 10 that load currents flowing in parallel through these coils and the associated buffer conductors 5a, 5b, respectively, tend to excite the core 10 in opposite directions. For load currents, then, the reactor coils 10a, 10b are in bucking or magnetically opposing relation. The core 10 therefore receives substantially no net magnetization from the load currents traversing the associated buffer conductors, and accordingly the inductor 9 offers substantially no impedance to such load currents.

It will now be evident that in the winding 3, 4 illustrated at FIG. 1, slightly different voltages may be induced in the two parallel buffer conductors 5a and 5b because they cannot be physically located in exactly the same turn locations upon the core 1. These buffer conductors are connected electrically in parallel circuit relation between the common internal connection point 6 and the midpoint of the reactor windings 10a, 10b. This parallel connection forms a loop circuit in which circulating current may flow as a result of unequal voltages induced in the buffer conductors. Circulating current flowing in this loop circuit, however, passes in series circuit relation through both of the reactor windings 10a, 10b. The circulating current in each reactor winding excites the reactor core 10 in the same direction, so that for circulating current the coils 10a, 10b are in magnetic aiding relation. The reactor 9, therefore, offers appreciable inductive impedance to any circulating current and is so designed that it limits the magnitude of such current to an acceptable or tolerable value.

Figure 2:
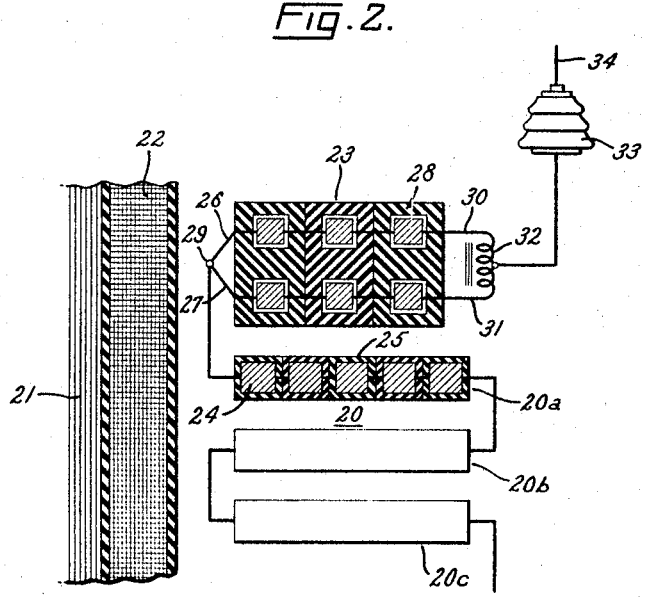
FIG. 2 is a partial cross-sectional view of a transformer including a spiral or disk type high voltage winding and schematically illustrating my invention.

At FIG. 2, I have shown my invention applied to a transformer having a spiral disk, or pancake type, high voltage winding 20 wound upon a central magnetizable core 21 concentrically with a low voltage winding 22. It will be understood that FIG. 2 shows only a partial cross section of the windings at one side of the core centerline. The high voltage disk winding 20 comprises a plurality of main winding sections 20a, 20b and 20c, only one of which is shown in cross section, and terminates in an end portion or buffer section 23. The sequence of turns in the disk winding 20 is schematically illustrated. It will be observed that the main winding portion is formed of a single conductor 24 covered with a relatively thin insulating coating 25 and having adjacent turns in series circuit relation. The end or buffer portion 23 of the winding 20 is formed of two buffer conductors 26, 27 carrying a heavier insulating coating 28 and wound in parallel physical relation. The buffer conductors 26 and 27 are connected together and to one end of the main conductor 24 at a common internal juncture 29 and have their outer terminal ends 30 and 31 connected together through a current limiting inductor 32 of the type described in connection with FIG. 1. The midpoint of the winding of the inductor 32 is connected through an insulating bushing 33 to a common external terminal 34.

As previously mentioned, the reason for using a plurality of buffer conductors in parallel circuit relation at the high voltage end portion of the winding is to provide a greater total cross section of copper to carry the winding current through the buffer end of the winding where heavier insulation is required because of higher voltage stresses at this end of the winding. It will, of course, be understood that, if desired, the main winding conductor and the buffer conductors may be formed of a stranded cable with suitable transpositions to balance induced voltages, as is well known to those skilled in the art. It is evident also that in transformers or reactors designed for very high load currents the main section of the winding may be formed of a plurality of parallel-connected conductors, each of which may be either solid or stranded, and that any desired number of parallel-connected buffer conductors may be utilized in the most heavily insulated end section of the winding. Unless larger conductor is used in the buffer setcion, the number of parallel-connected buffer conductors should be greater than the number of conductors in the main section of the winding. Since it is difficult to braze together conductors of different size, it is customary to use the same size of conductor or cable in the buffer section as is used for the main winding. For this reason the number of buffer conductors is usually greater than the number of main conductors. It will, of course, be understood by those skilled in the art that my invention is applicable to any plural number of parallel-connected buffer conductors regardless of the number of conductors in the main winding section. Further reference will be made hereinafter to winding arrangements utilizing one or more parallel conductors in the main section of the winding and more than two parallel buffer conductors.

Referring now to FIGS. 3 and 4, I have illustrated a current limiting inductive reactor of a design particularly adapted for use in loop circuits formed by pairs of parallel connected buffer conductors as schematically illustrated at FIGS. 1 and 2. At FIG. 3, I have indicated schematically a single main winding conductor M and two parallel connected buffer conductors B1 and B2 connected to the main conductor at a common internal connection C. The outer terminal ends of the buffer conductors B1 and B2 are connected through a current limiting inductive reactor R to a common external terminal lead T.

The same reactor structure is illustrated at both FIG. 3 and FIG. 4. As illustrated, the reactor R comprises a core 40, preferably of toroidal configuration, and a pair of fractional turn windings in the form of two linear conductors passing axially through the core 40. In the illustrated embodiment of the invention the axial conductors are of the concentric type, one being a conducting cylinder or tube 41 and the other a conductor 42 shown schematically as passing concentrically through the tube 41. The tubular conductor 41 is provided at each end with a conducting connector ring 43, and suitable insulation 44 is provided between the tubular conductor 41 and the core 40. This reactor assembly is mounted within a cylindrical insulating housing 45 and surrounded externally by a cylindrical electrostatic shield 46 of conducting material. The electrostatic shield 46 and the core 40 are tied electrically to the potential of the tubular axial conductor 41 by means of metallic conducting straps 47 connected between these parts and one of the connecting rings 43. For the purpose of diminishing steep voltage gradients at the edges of the electrostatic shield 46 it is desirable, as shown, to provide additional conducting material in the region of these edges. In the form of the invention shown, several insulated conducting cables 48 are wound around each edge of the shield and electrically connected thereto.

The reactor R is shown at FIG. 3 to be connected in a loop circuit composed of a single pair of buffer conductors, as illustrated also at FIGS. 1 and 2. In order that the concentric axial fractional turn conductors 41 and 42 of the reactor R may be connected in magnetic opposing or bucking relation with respect to load current, these conductors are connected each to one of the buffer conductors B1 and B2 in such a way that load currents through the two buffer conductors traverse the axial winding conductors 41 and 42 in opposite directions. Specifically, in FIG. 3 the buffer conductor B1 is connected directly to the left end of the axial conductor 42 and through it to the external terminal T. The tubular axial conductor 41 is connected in series circuit relation with the buffer conductor B2 but in the opposite sense in that the conductor B2 is connected to the right hand end of axial conductor 41 and through it to the terminal T. The substantially equal load currents flowing through the parallel connected buffer conductors B1 and B2 thus traverse the axial conductors 41, 42 in opposite directions so that they tend to excite the core magnetically in opposite senses. The substantially equal load currents therefore do not appreciably excite the core 40 so that the reactor R offers very little impedance to load current. On the other hand, the buffer conductors B1, B2 form with the axial conductors 41 and 42 a loop circuit so connected that any circulating current passing through the loop circuit traverses the axial conductors 41 and 42 in the same direction. Current circulating in the loop therefore produces an unbalanced excitation of the core 40 and the reactor thus provides an appreciable inductive impedance in the loop circuit.

FIG. 4 shows a current limiting inductor with FIG. 3, construction as that described in connection with FIG. 3, but shows this inductor connected to three buffer conductors B1, B2 and B3 which in turn branch at internal connection points C and C1 from two main conductors M1 and M2. It will be noted from FIG. 4 that the buffer conductors B1 and B 2 are connected through the concentric axial reactor windings 41 and 42 in opposite senses in the same manner as at FIG. 3. The third buffer conductor B3, however, completely bypasses the reactor R and is connected directly to the external terminal T. Where three such buffer conductors as in FIG. 3 are wound in parallel side-by-side relation, it is preferable that the central one of the conductors bypass the core, as the conductor B3 of FIG. 3. It will be evident that circulating current in conductor B3 is limited by the reactor R for the reason that any loop circuit including the buffer conductor B3 includes also one or the other of the fractional turn reactor windings 41, 42.

At FIGS. 5 to 9 inclusive I have further illustrated the manner in which load current balanced current limiting reactors may be connected in accordance with my invention to inductive windings having at the high voltage end more than two parallel-connected buffer conductors. FIG. 7, for example, shows three buffer conductors B1, B2 and B3 branching off from a single main conductor M and connected through a single current limiting reactor R to the external terminal lead T. It will be observed that the reactor connection at FIG. 7 is the same as that at FIG. 4, and that the number of main conductors leading to the buffer conductors is not material to the manner of connecting the reactor. Similarly it will be observed that FIGS. 5 and 8 each show four buffer conductors, and that their manner of connection to the several reactors required in this case is the same regardless of the fact that FIG. 5 shows three main conductors while FIG. 8 only a single main conductor. The same is true in respect to FIGS. 6 and 9 in each of which five buffer conductors are shown. The only difference in the circuits of FIGS. 6 and 9 is that FIG. 9 has a single main conductor, whereas FIG. 6 shows four main conductors. In each of these figures the reactor connections are the same.

Referring now more particularly to FIGS. 5 and 8, the three main conductors M1, M2 and M3 of FIG. 5 (or the single main conductor M of FIG. 8) are connected to four buffer conductors B1, B2, B3 and B4. The single pair of buffer conductors B3, B4 is connected through a first reactor R1 in the manner shown at FIG. 3, with the midpoint or common terminal of the reactor windings connected directly to the external terminal T. A similar connection of the other pair of buffer conductors B1, B2 is made through a second reactor R2 which also has the midpoint of its windings connected directly to the external terminal T. It will be observed that any loop circuit selected through any two of the buffer conductors B1, B2, B3, B4 will include at least some of the current limiting windings of the reactors R1, R2 in such a way that the circulating current will positively excite the reactor cores.

At FIGS. 6 and 9 there is shown a current limiting reactor connection for five buffer conductors B1, B2, B3, B4 and B5, there being shown at FIG. 9 a single main conductor and at FIG. 6 four main conductors. Referring then more particularly to FIG. 6, it will be observed that the pair of buffer conductors B1, B2 is connected through a first reactor R1 to an intermediate conductor B' and that the buffer conductor B4 is connected directly to the conductor B' and the winding midpoint of the reactor R1. This connection of the buffer conductors B1, B2 and B4 to the intermediate conductor B' is similar to the three conductor connection of FIGS. 4 and 7. Similarly the buffer conductors B2 and B3 of FIG. 6 are connected through a second current limiting reactor R2 to a second intermediate conductor B" while the buffer conductor B5 is connected directly to the winding midpoint of reactor R2 and to the conductor B". The conductors B' and B" now constitute a single pair which are in turn connected through a current limiting reactor R3 in the manner of FIG. 3 to an external terminal T.

It will now be evident to those skilled in the art that by either parallel or multi-stage connection of a plurality of current limiting reactors, as shown by way of example at FIGS. 5 to 9 inclusive, a large plurality of buffer conductors may be accommodated in accordance with my invention and that the number of incoming main conductors from which the buffer conductors branch off is not material to the manner of connecting the reactors. It will be further observed in general that if the number $n$ of buffer conductors is an even number greater than two, the number of reactors is equal to half the number of buffer conductors. If the number $n$ of buffer conductors is an odd number greater than two, then all except one of the current limiting reactors have their winding midpoints connected to the external terminal through at least one other reactor.

While I have shown and described a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In a stationary electric induction apparatus, an inductive winding comprising a main winding section formed of a plurality of turns of one or more insulated conductors, a winding end portion connected in series circuit relation with said main winding section and formed of a plurality of more heavily insulated buffer conductors $n$ in number, the number $n$ of said buffer conductors being greater than the number of conductors in said main winding section, said buffer conductors being disposed in substantially parallel physical relation and having a common internal connection at one end to all conductors of said main winding section, and impedance means connecting the terminal ends of at least $n$ minus 1 of said buffer conductors to a common external winding terminal, with all loop circuits formed by at least two of said buffer conductors between said common connection and said external terminal including at least a portion of said impedance means.

2. Apparatus according to claim 1 in which said buffer conductors are three in number and positioned in side-by-side relation with one said conductor between the other two, said one conductor being connected directly to said external winding terminal without traversing said impedance means.

3. Apparatus according to claim 1 wherein said impedance means comprises at least one inductive reactor including a core and winding, means connecting said reactor winding in series circuit relation between terminal ends of two of said buffer conductors, and means connecting the midpoint of said reactor winding to said external terminal, the portions of said reactor winding on opposite sides of said midpoint being disposed in opposed magnetic relation in respect to load currents through said buffer conductors and in aiding magnetic relation in respect to circulating current in the loop circuits including both said conductors.

4. Apparatus according to claim 3 in which $n$ is an even number greater than 2, and $n/2$ inductive reactors are provided with the midpoints of their windings connected together and directly to said external terminal, a separate pair of said buffer conductors being interconnected through each of said reactors.

5. Apparatus according to claim 3 in which $n$ is an odd number greater than 2, one said inductive reactor has its winding midpoint connected directly to said external terminal, and all other reactors have their winding midpoints connected to said external terminal through at least said one reactor.

6. Apparatus according to claim 3 in which said core is of ring configuration and said winding comprises a pair of parallel conductors traversing said core substantially axially and connected to carry the load currents of said two buffer conductors in opposite directions through said core.

7. Apparatus according to claim 6 in which said parallel conductors are concentric.

8. Apparatus according to claim 6 in which said core is encased in a substantially cylindrical metallic shield, and said core and shield are connected electrically together and to one of said parallel conductors.

9. Apparatus according to claim 7 in which one said parallel conductor is tubular and connected electrically to said core.

10. Apparatus according to claim 9 in which said core is encased in a substantially cylindrical metallic shield, and said core and shield are connected electrically together and to said tubular conductor.

References Cited

FOREIGN PATENTS 551,623  1/1958  Canada.

DARRELL L. CLAY, *Primary Examiner.*

T. J. KOZMA, *Assistant Examiner.*